United States Patent [19]

Coomer

[11] 4,020,459
[45] Apr. 26, 1977

[54] PARITY GENERATION AND BUS MATCHING ARRANGEMENT FOR SYNCHRONIZED DUPLICATED DATA PROCESSING UNITS

[75] Inventor: Stephen Dexter Coomer, Westerville, Ohio

[73] Assignee: Bell Telephone Laboratories, Incorporated, Murray Hill, N.J.

[22] Filed: Oct. 28, 1975

[21] Appl. No.: 626,338

[52] U.S. Cl. .............. 340/146.1 AG; 235/153 AM; 235/153 AE
[51] Int. Cl.² ........................................ G06F 11/10
[58] Field of Search ........ 340/146.1 AG, 146.1 BE; 235/153 AE, 153 BN, 153 AM

[56] References Cited
UNITED STATES PATENTS

| | | | |
|---|---|---|---|
| 2,892,888 | 6/1959 | James et al. | 340/146.1 BE |
| 3,221,154 | 11/1965 | Gesek et al. | 340/146.1 AG |
| 3,303,482 | 2/1967 | Jenkins | 340/146.1 AG |
| 3,763,470 | 10/1973 | Geng et al. | 340/146.1 AG |
| 3,789,204 | 1/1974 | Barlow | 340/146.1 AG |
| 3,914,741 | 10/1975 | Bonser et al. | 340/146.1 C |

Primary Examiner—Charles E. Atkinson
Attorney, Agent, or Firm—Martin S. Landis

[57] ABSTRACT

A diagnostic and parity generation arrangement is disclosed for use with a pair of duplicated processing units operating in synchronism. A distinct parity generator is associated with the "output bus" of each processor for indicating the parity of the information thereon. When a peripheral address register is loaded, the parity indications generated by the parity generators are compared to ensure that identical information is being applied to the output buses; and when information is written in memory, these same parity indications are combined to generate parity information over the data to be stored and over the address at which the data and the generated parity information are stored. These same parity indications are also utilized during read operations to generate another parity indication which is compared with a retrieved parity indication.

7 Claims, 8 Drawing Figures

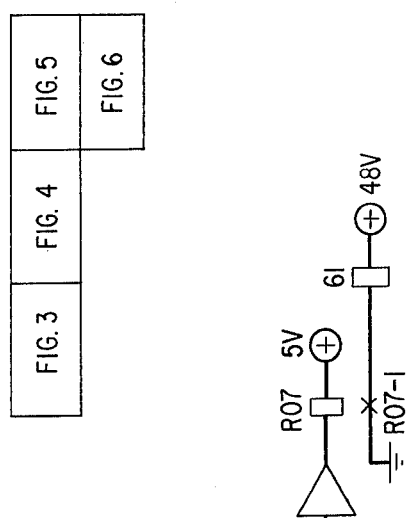
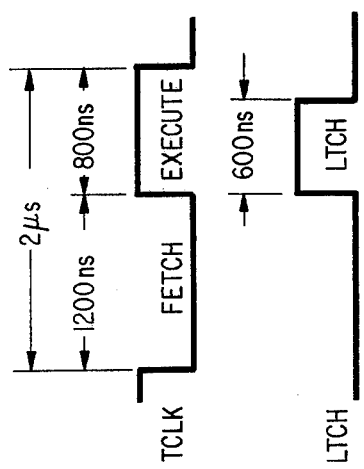
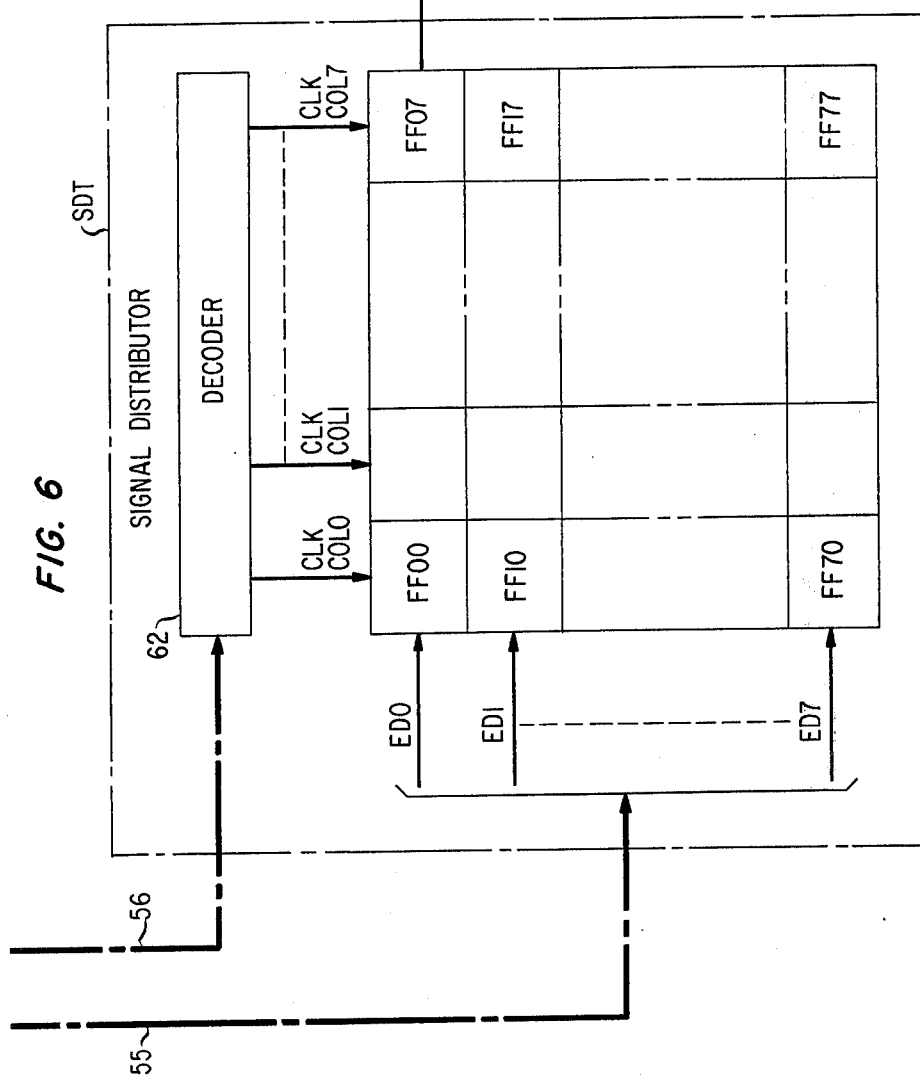

PARITY GENERATION AND BUS MATCHING ARRANGEMENT FOR SYNCHRONIZED DUPLICATED DATA PROCESSING UNITS

FIELD OF THE INVENTION

This invention pertains to data processing apparatus and, more particularly, to diagnostic operations for synchronized duplicated data processing units. Even more particularly, this invention pertains to the generation and comparison of parity information during bus operations and during memory accesses by the synchronized duplicated data processing units.

BACKGROUND OF THE INVENTION AND PRIOR ART

Many years ago computer designers realized that the integrity of data processing operations could best be verified by performing the same operations at the same time utilizing duplicated equipment. This concept was implemented as early as the late 1940s in a data processing machine called the EDVAC. This machine utilized duplicated arithmetic units and the outputs of the arithmetic units were compared at the end of each operation.

Later systems such as the arrangement disclosed in U.S. Pat. No. 3,471,686 issued on Oct. 7, 1969 J. B. Connell elaborated upon this matching scheme and discovered that data matching could be benefically performed on multiple data sources during different time intervals within a single machine cycle.

J. P. Caputo et al. U.S. Pat. No. 3,770,948, issued Nov. 6, 1973, discloses another prior art diagnostic arrangement in which comparisons are made between the outputs of data handling circuits. In this arrangement, a pair of data selectors supply sets of pairs of signals to be compared by a comparator.

Concurrent with the development of more sophisticated matching techniques for data processing units, substantial strides have also been made in the area of memory diagnostics. For example, G. J. Barlow discloses a prior art memory diagnostic arrangement in his U.S. Pat. No. 3,789,204, issued January 29, 1974, in which a first parity generator provides a parity indication for a memory address while a second parity generator provides another parity indication for the data to be stored at this address. These two parity indications are combined by an EXCLUSIVE OR gate and the resulting parity bit is written into memory along with the data. When information is accessed from the memory, a third parity generator, which Barlow calls a parity checker generates a parity indication over the retrieved data. The parity indication over the address is combined with the retrieved parity bit, which represents the parity over the data and address, to generate another parity indication just over the data. This parity indication just over the data is then compared with the generated parity for the data. This arrangement appears to be useful in detecting memory and addressing faults susceptible of being detected by utilization of a single parity bit. However, the arrangement is complicated in that three separate parity generators are required and these generators only perform diagnostic operations directly related to memory accesses.

It is an object of this invention to effectively and economically perform bus comparisons and memory diagnostics utilizing the same parity generators.

It is a further object of this invention to reduce the number of parity generators required for memory diagnostics.

SUMMARY OF THE INVENTION

In accordance with one illustrative embodiment implementing the principles of my invention, a diagnostic and parity generation arrangement is disclosed for use with a pair of duplicated processing units operating in synchronism to perform the same processing activities at essentially the same time. A distinct parity generator is associated with the output bus of each processor for indicating the parity of the information thereon. More specifically, one parity generator indicates the parity of the information on one output bus while the other parity generator indicates the parity over information in a register, called the peripheral address register, which is loaded directly with information on the other output bus.

When the peripheral address register is loaded with an address identifying equipment or information in any type of peripheral equipment associated with the duplicated processing units, the parity indications generated by the parity generators are compared to ensure that identical information is being applied by the respective data processing units to their output buses.

Moreover, when information is to be written in memory, the parity indications generated by these parity generators are combined, not to generate a bus comparison signal as before, but rather to provide a combined parity indication over the data and address associated with the write operation. This parity indication is then stored in memory along with the data.

When data is retrieved from memory along with its associated parity indication, the same parity generators are now utilized to generate a parity indication over the address and retrieved data. The retrieved parity indication is then compared with the generated parity indication. To elaborate, the data retrieved from memory is applied to the processing units over input buses and gated through each of the processing units onto their respective output buses. One of the parity generators then provides a parity indication for the retrieved data on the output bus while the other parity generator continues to provide a parity indication for the address. These parity indications are combined and the resultant parity is then compared with the retrieved parity indication to detect any malfunctions.

In accordance with one feature of my invention, the parity generators utilized for memory diagnostic operations are also utilized for bus comparisons.

In accordance with another feature of my invention, the same parity generators can be utilized during both read and write operations. This is accomplished, in part, by gating information retrieved from memory through the processing units and back onto their output buses. The performance of memory diagnostics on the data actually received by the processing units is beneficial in that the received data is utilized as part of the diagnostics instead of utilizing data merely placed on an output bus for later receipt by a data processing unit.

In accordance with still another feature of my invention, two parity generation circuits are beneficially utilized in the performance of each of the following functions (1) bus matches; (2) generation of parity information for storage in memory; and (3) generation of parity information for data retrieved from memory.

BRIEF DESCRIPTION OF THE DRAWINGS

The foregoing as well as other objects, features, and advantages of my invention will be more apparent from a description of the drawing in which:

FIGS. 3 through 6, when arranged as shown in FIG. 7, illustrate an illustrative data processing system in which one specific illustrative embodiment of my invention is utilized; more specifically, FIG. 3 discloses a duplicated microprocessing system and parity generation, parity check and bus match circuitry;

FIG. 4 illustrates some of the peripheral circuits associated with the microprocessing system of FIG. 3 including random access memories and duplicated data links and associated interface circuitry, system clock and diagnostic control circuitry;

FIG. 5 illustrates a scanner which provides automatic message accounting information to the microprocessing system; and FIG. 6 illustrates a signal distributor operative under the control of the mciroprocessing system;

FIG. 7 illustrates the manner in which FIGS. 3 through 6 are to be arranged; and FIG. 8 illustrates the time and voltage relationships of the clock waveforms generated by the clock illustrated in FIG. 4.

GENERAL DESCRIPTION

Figure 1:
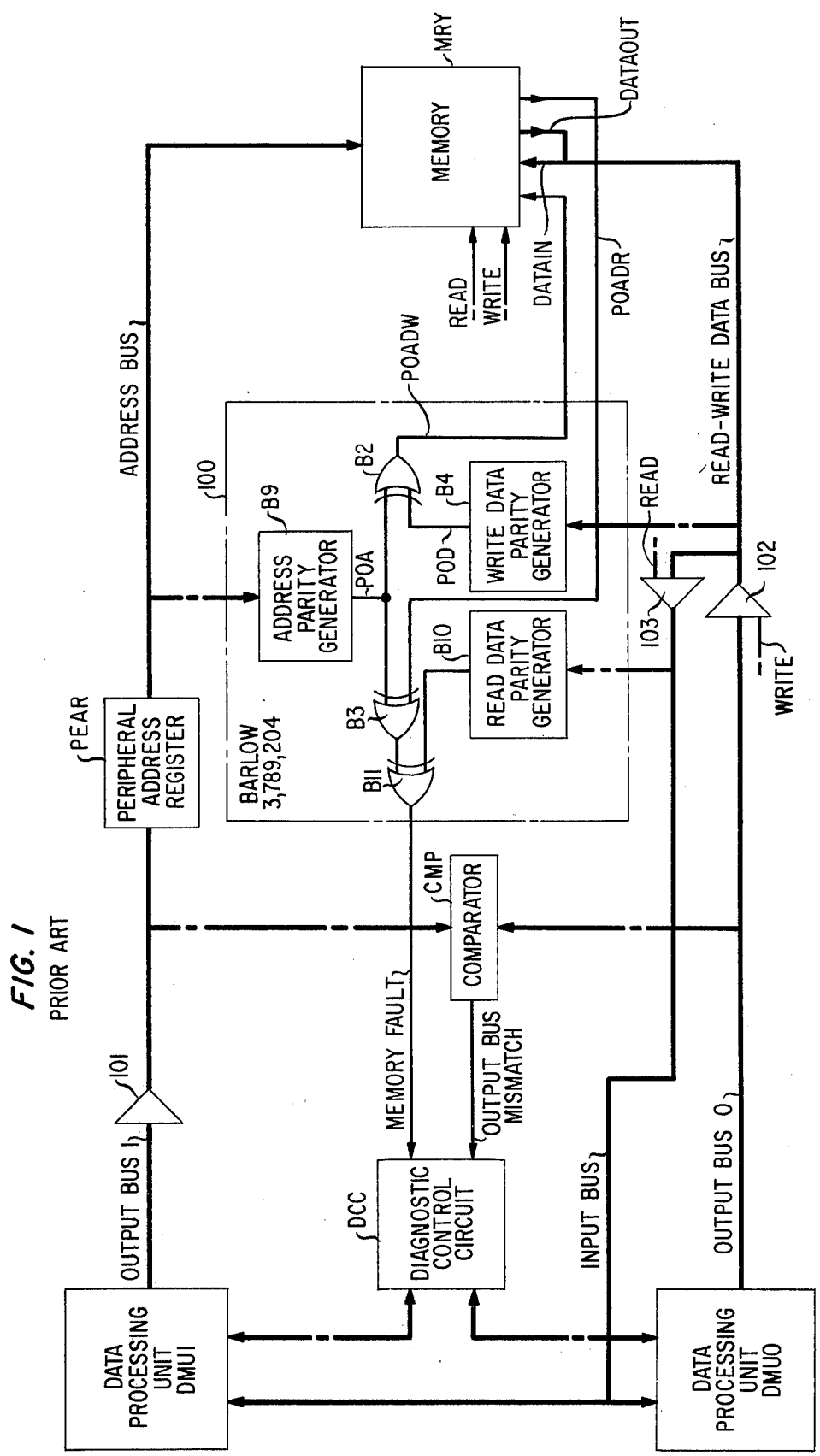
FIG. 1 diagramatically illustrates a prior art parity generation and bus comparison circuit for use with duplicated data processing units.

FIG. 1 illustrates prior art parity generation and diagnostic circuitry associated with a duplicated data processing system. This circuitry is adapted to perform three functions: (1) to compare the data at the output buses from each of the data processing units to ensure that both units are operating in synchronism and are properly applying data to the output buses; (2) to generate a parity bit over the address and data when information is to be written in memory; and (3) when data is read from memory, to combine the parity bit retrieved from memory, with a parity bit generated over the address and then compare the combined bit with a parity bit over the retrieved data utilized to access the memory.

The latter two functions are performed by circuit 100 in accordance with the teaching of the above-specific Barlow patent. The first function is performed by comparator CMP.

To elaborate, FIG. 1 illustrates a microprocessing system comprising duplicated processing units DMU1 and DMU0 which operate in synchronism to perform logical and arithmetic operations on data and instructions. Units DMU0 and DMU1 retrieve program instuctions from a memory, not shown, and execute the program instructions simultaneously.

The microprocessing system also includes memory MRY which can comprise any type of memory normally used for storing transient data. To access this memory, an address is loaded into peripheral address register PEAR and applied to memory MRY over the address bus. Data is retrieved from and written-in memory MRY over the read-write data bus.

More specifically, to write data in memory MRY, both data processing units DMU1 and DMU0 apply an address to their respective output buses 1 and 0. This address on output bus 1 is buffered by gate 101 and then applied in parallel to peripheral address register PEAR, where the address is gated-in under the control of timing circuitry, not shown here. As mentioned previously, this address is also output over output bus 0, but is inhibited from reaching the read-write data bus because gate 102 is not enabled (i.e., lead WRITE is LOW).

Comparator CMP compares the addresses on the output buses on a bit-by-bit basis to ascertain whether or not they match. If the addresses do not match, comparator CMP generates a signal over the lead OUTPUT BUS MISMATCH to so inform diagnostic control circuit DCC. Normally, the data processing units themselves are self-contained packages comprising groups of integrated circuits and the like. These processing units are connected to the pripheral circuits via input and output buses, which are often physically implemented as connectorized bundles of fine gauge wire. These bundles of wire are susceptible to many external contingencies (e.g., electrical noise) and sometimes break or become unplugged. Thus, irrespective of any internal checking between processing units, it is essential to compare the data received over the duplicated output buses to ensure the physical and electrical integrity of such buses.

Now assuming a write instruction is to be executed, the data to be written in memory MRY is applied by each of the processing units to the respective output buses. Comparator CMP again checks the data to detect any mismatches. Since a write instruction is specified, buffer gate 102 is now enabled and applies the data to the read-write data bus. Memory MRY is arranged so that the data on the read-write bus is stored, with a parity bit over the address and data, at the address indicated over the address bus from register PEAR.

The generation of this parity bit will now be described. Address parity generator B9 generates a parity bit over the address and applies this parity bit to EXCLUSIVE OR gate B2 over lead POA. Write data parity generator B4 generates and applies another bit to this gate over lead POD indicating the parity over the data to be written in memory. Gate B2 combines the parity over the address with the parity over the data to generate parity over the address and data, which parity is applied to memory MRY over lead POADW.

Memory MRY stores the data on the READ-WRITE DATA BUS (actually the DATAIN BUS) along with the parity bit indicated on lead POADW, in the memory address indicated over the ADDRESS BUS.

When data is to be read from memory MRY, an address is loaded into register PEAR in the manner described above and, on the next instruction, the data stored at the specified address in memory MRY is output over bus DATAOUT onto the READ-WRITE DATA BUS. The retrieved parity bit is applied at the same time over lead POADR to gate B3. The retrieved data is gated through buffer gate 103 because lead READ is HIGH and applied over the INPUT bus to both processing units. At the same time, address parity generator B9 generates parity over the address utilized to retrieve the data and applies this parity to EXCLUSIVE OR gate B3 over lead POA. Read data parity generator B10 generates parity over the retrieved data and applies this parity indication to gate B11. Gate B3 combines the retrieved parity indication over the data and address with the parity indication generated over the address to derive parity over the data, and applies the combined parity indication over the data to gate B11. Gate B11 compares this parity with the generated parity bit over the data retrieved from memory. If the generated and retrieved parities do not match, gate B11 generates a HIGH indication on lead MEMORY FAULT. This indicates to diagnostic control circuit DCC a memory access problem. Generator B10 and gate B11 in combination are equivalent to Barlow's parity chamber 10.

Figure 2:
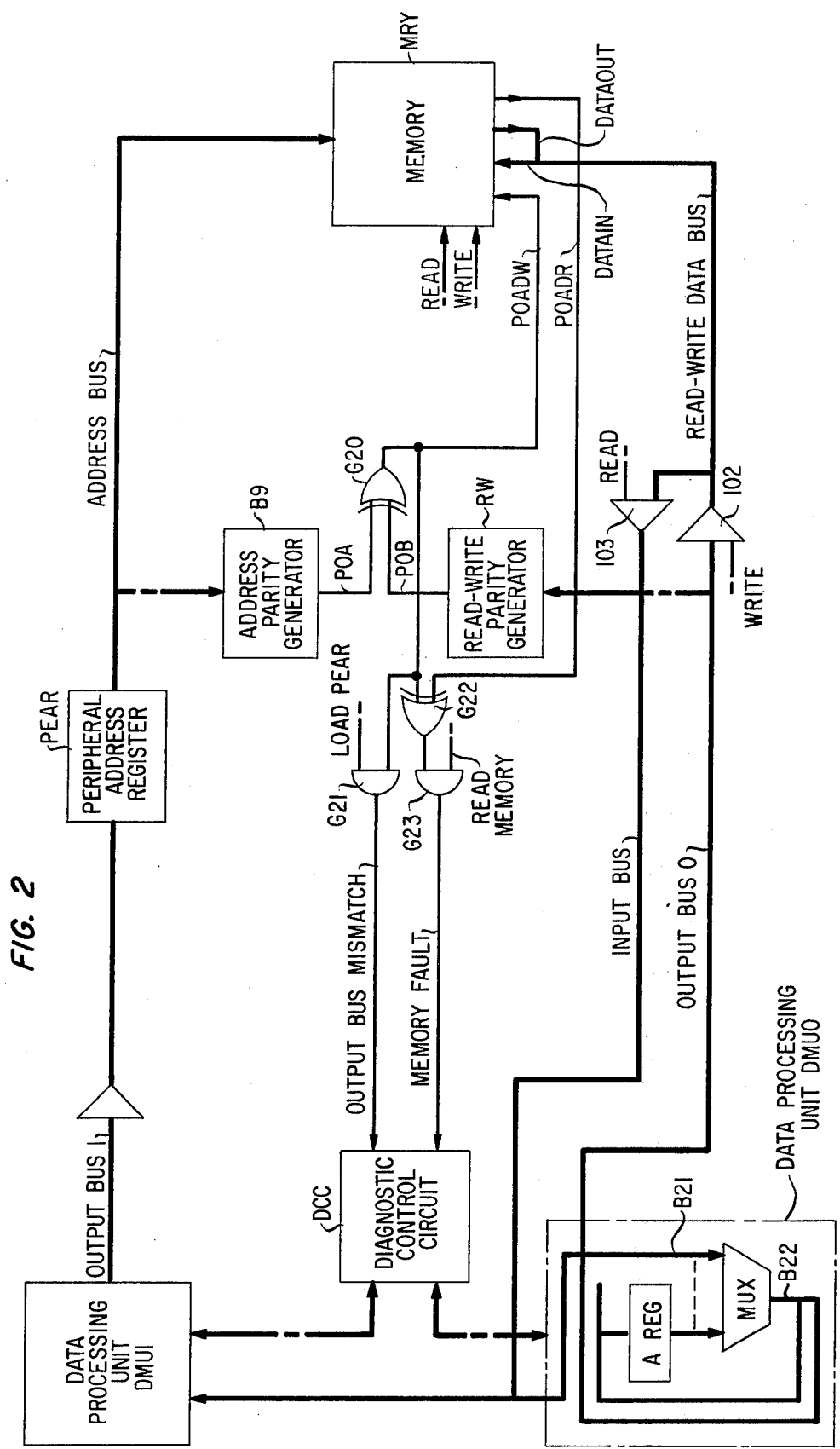
FIG. 2 illustrates an improved parity generation and comparison circuit for use with duplicated data processing units and operable in accordance with the principles of my invention.

FIG. 2 illustrates in block diagram form an improved parity generation and comparison circuit operative in accordance with the principles of my invention to perform each of the three functions previously mentioned.

To elaborate, when data is to be written in memory MRY, both data processing units DMU1 and DMU0 apply an address over their respective output buses 1 and 0. This address is gated from output bus 1 into peripheral address register PEAR. Address parity generator B9 generates parity over the address and applies this parity over lead POA to EXCLUSIVE OR gate G20. At the same time, read-write parity generator RW generates parity over the address on output bus 0 and applies this parity over lead POB to gate G20. Gate G20 generates a combined parity indication, which in effect, compares the two generated parities. If the parities do not match, the output of gate G20 will be HIGH and AND gate G21 will generate a HIGH signal on lead OUTPUT BUS MISMATCH to indicate to diagnostic control circuit DCC that the address applied to the output buses do not match. The output of gate G21 is "applied" to circuit DCC only when lead LOAD PEAR is HIGH. This LOAD PEAR lead also serves to gate information from OUTPUT BUS 1 to register PEAR.

Thus in accordance with a feature of my invention, the parity generators are utilized to perform a comparison function and accordingly, comparator CMP utilized in the prior art arrangement of FIG. 1 is no longer required.

To continue, the data to be written in memory MRY is applied to both output buses during the execution of a subsequent instruction and gated through buffer gate 102, onto the READ-WRITE DATA BUS. Now, read-write parity generator RW generates parity over the data rather than over the address as described previously and the parity over the data is therefore applied over lead POB to gate G20. Gate G20 combines this parity over the data with the parity over the address which still is indicated over lead POA. Gate G20 generates on lead POADW a combined parity over the address and data. Then memory MRY, responsive to the HIGH state of lead WRITE, stores the data on the READ-WRITE DATA BUS and the parity indication on lead POADW at the address indicated on the ADDRESS BUS.

To read from memory, an address is output over both output buses and gated into register PEAR, in the manner described above, and the previously described "bus comparisons" are again instituted. Then on the next instruction, memory MRY, responsive to the HIGH state of lead READ, responds to the address on the address bus and retrieves the data stored at this address and applies the data to the read-write data bus. At the same time, the parity bit stored with the data is retrieved and applied over lead POADR to EXCLUSIVE OR gate G22. The retrieved data is gated through buffer gate 103 because lead READ is HIGH and is applied to the INPUT buses of both processing units. This data is gated by multiplexer MUX in each processing unit from the INPUT bus back onto the output bus of each processor. Thus with reference to unit DMU0, the data on the INPUT bus is applied to bus B21 and through multiplexer MUX onto bus B22 and then onto OUTPUT BUS 0.

Address parity generator B9, still outputs the parity over the address utilized to retrieve the data; but now read-write parity generator RW responsive to the data now on OUTPUT BUS 0 generates parity over the retrieved data on lead POB. Gate G20 then provides a combined parity indication over the address and retrieved data to gate G22 which compares the retrieved parity bit on lead POADR with the parity bit generated by gate G20 and generates a HIGH output if they mismatch. If these parity bits do not match, gate G23 responsive to the HIGH state of lead READ MEMORY generates a HIGH output to so inform diagnostic control circuit DCC.

In accordance with another feature of my invention, data retrieved from memory is gated into the processing units and then back out of the processing units onto their respective output buses. Then parity is generated over the addressed retrieved data as actually received by a processing unit and matched with the retrieved parity indication. This technique is very useful in two regards; namely, a separate parity generator such as read-data parity generator B10 in FIG. 1 is eliminated and, more importantly, the parity comparison has been made over the data actually received by a processing unit. This gating through the units ensures the integrity of the output buses and some of the internal gating circuitry in the processing units, as well as the integrity of the input bus. The prior art arrangement of FIG. 1 performs a parity check over the data on the input bus, but does not ensure that such data was properly received by the data processing units.

To summarize the above, my parity generation circuits, in addition to performing the usual parity bit generation for writing, also perform comparisons between addresses on the output bus and addresses on the address bus, which addresses should be identical when register PEAR is loaded. Moreover, by looping data read from memory onto the input bus through the processing units and back onto the output buses, the same parity generator can be utilized for both read and write operations; and moreover the parity comparison utilized for read operations is instituted over the data actually received by the processing units.

DETAILED DESCRIPTION

FIGS. 3 through 6, when combined as shown in FIG. 7, illustrate one illustrative embodiment of my invention implemented in a microprocessing system adapted to compile automatic message accounting (AMA) information in a telephone system. More specifically, the depicted arrangement is part of a billing data transmitter (BDT) which compiles AMA information from an electromechanical telephone switching office, formats the AMA information into billing data, and then transmits this billing data over data links to another data processing center (not shown) called the No. 1 AMA Recording Center (No. 1 AMARC).

Figure 3:
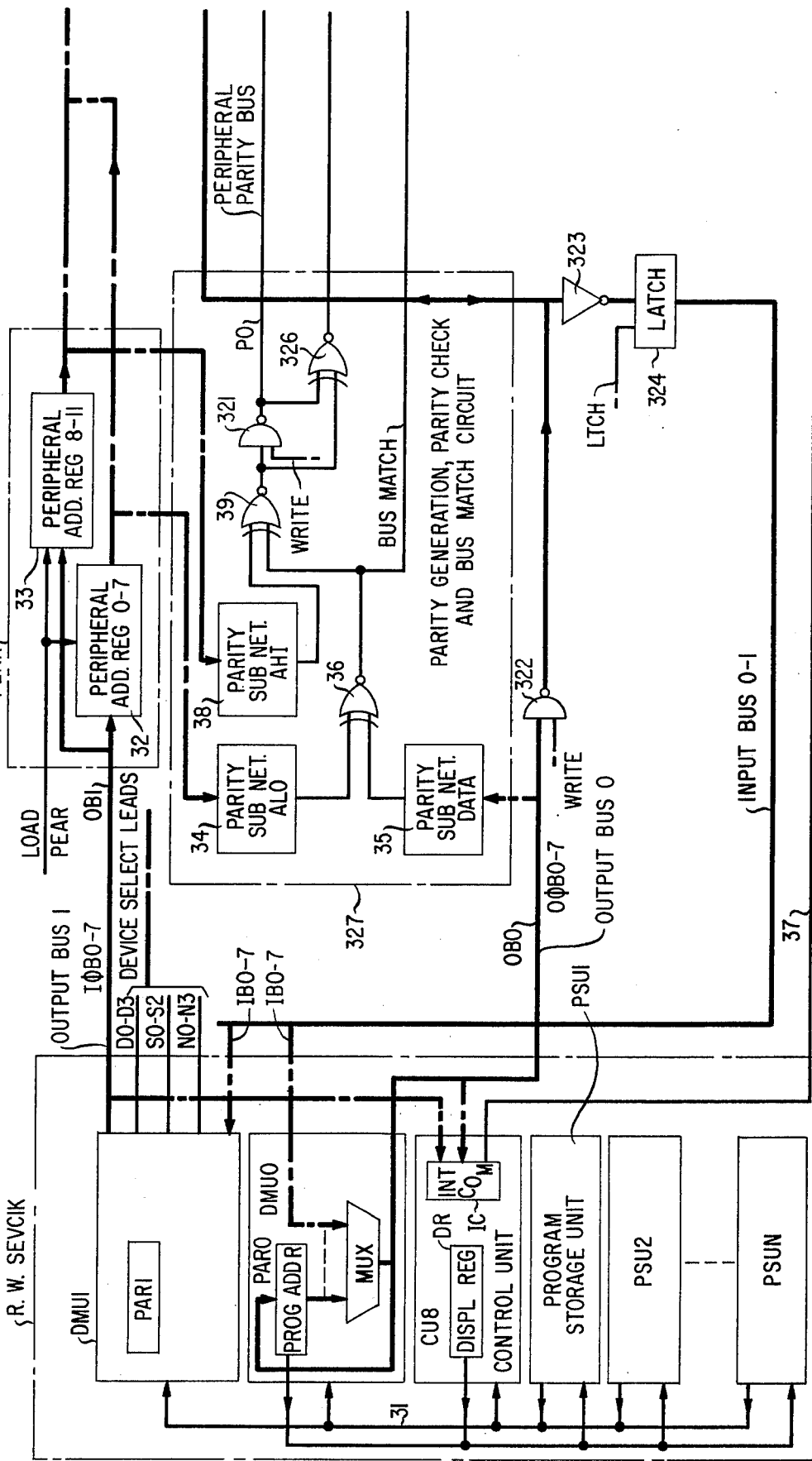
Figure 4:
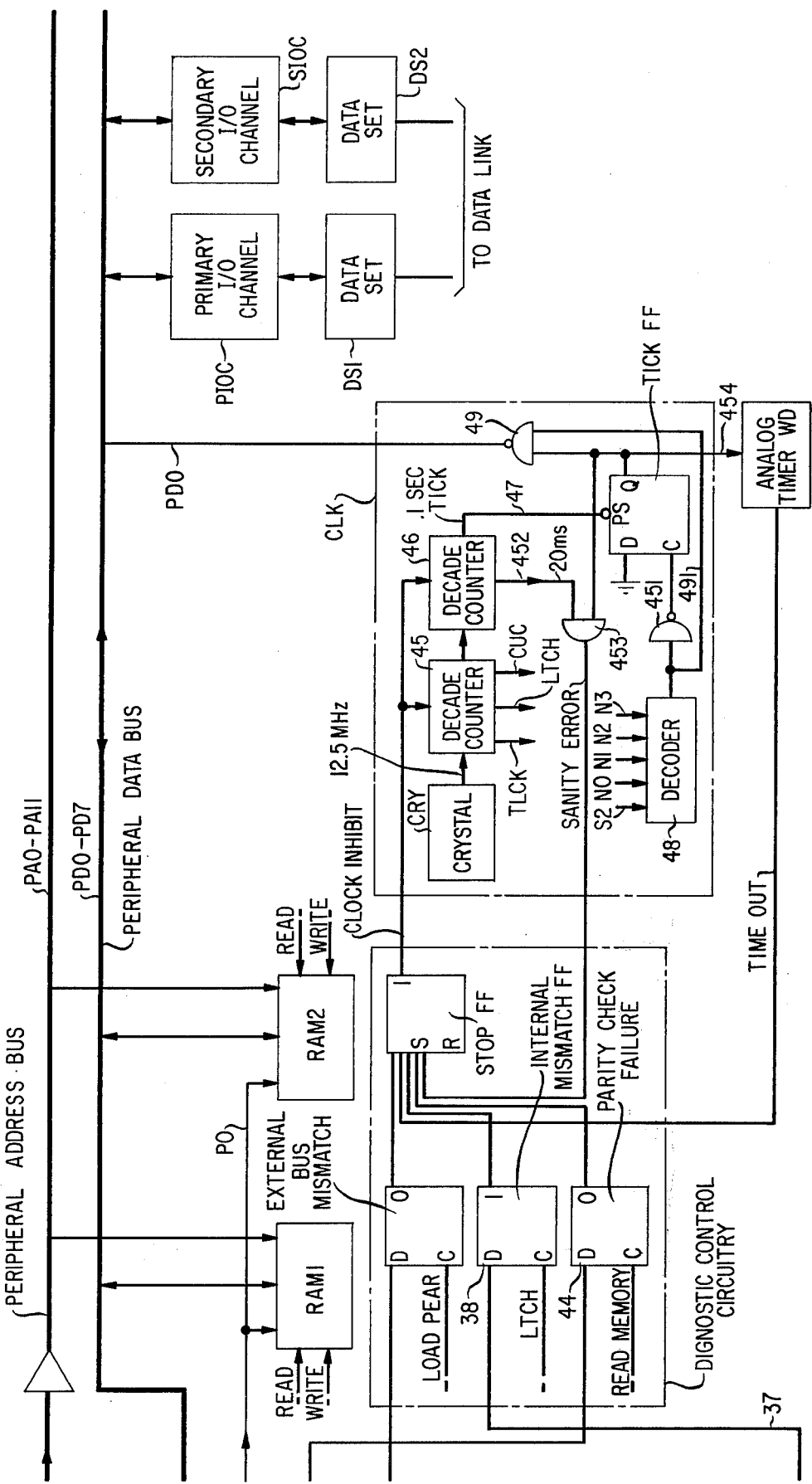

The heart of the billing data transmitter is the duplicated microprocessing system shown in the left portion of FIG. 3. Processing units DMU0 and DMU1 are well-known commercial microprocessors and may, for example, be the microprocessors disclosed in R. W. Sevcik application Ser. No. 450,896, filed Mar. 13, 1974 now U.S. Pat. 3,934,090, Jan. 20, 1976. These data processing units are well-known data manipulation units comprising arithmetic and logic units, an accumulator, a multiplexer, and plurality of multi-purpose registers. Also shown in FIG. 3 is control unit CU8 (corresponds to circuit 1 in FIG. 2 of Sevcik) which operates in conjunction with the two data processing units to perform diagnostic operations, such as internal data comparisons, parity checks and also provides a portion of the address information utilized to access read only memories PSU1 — PSUN (memory 24 in Sevcik). These program storage units store at addressable locations program order words each comprising 24 bits. The basic format of these program instructions are illustrated in FIG. 4 of the above-mentioned Sevcik application. To simplify the explanation of my invention, only those portions of the microprocessors necessary for a complete understanding of my invention are disclosed. Moreover, to simplify the drawing multiplexer MUX is utilized in place of Sevcik's decoder 211 and gates 214-217, for example. Such a substitution of logical equivalents is well known and self explanatory.

Figure 5:
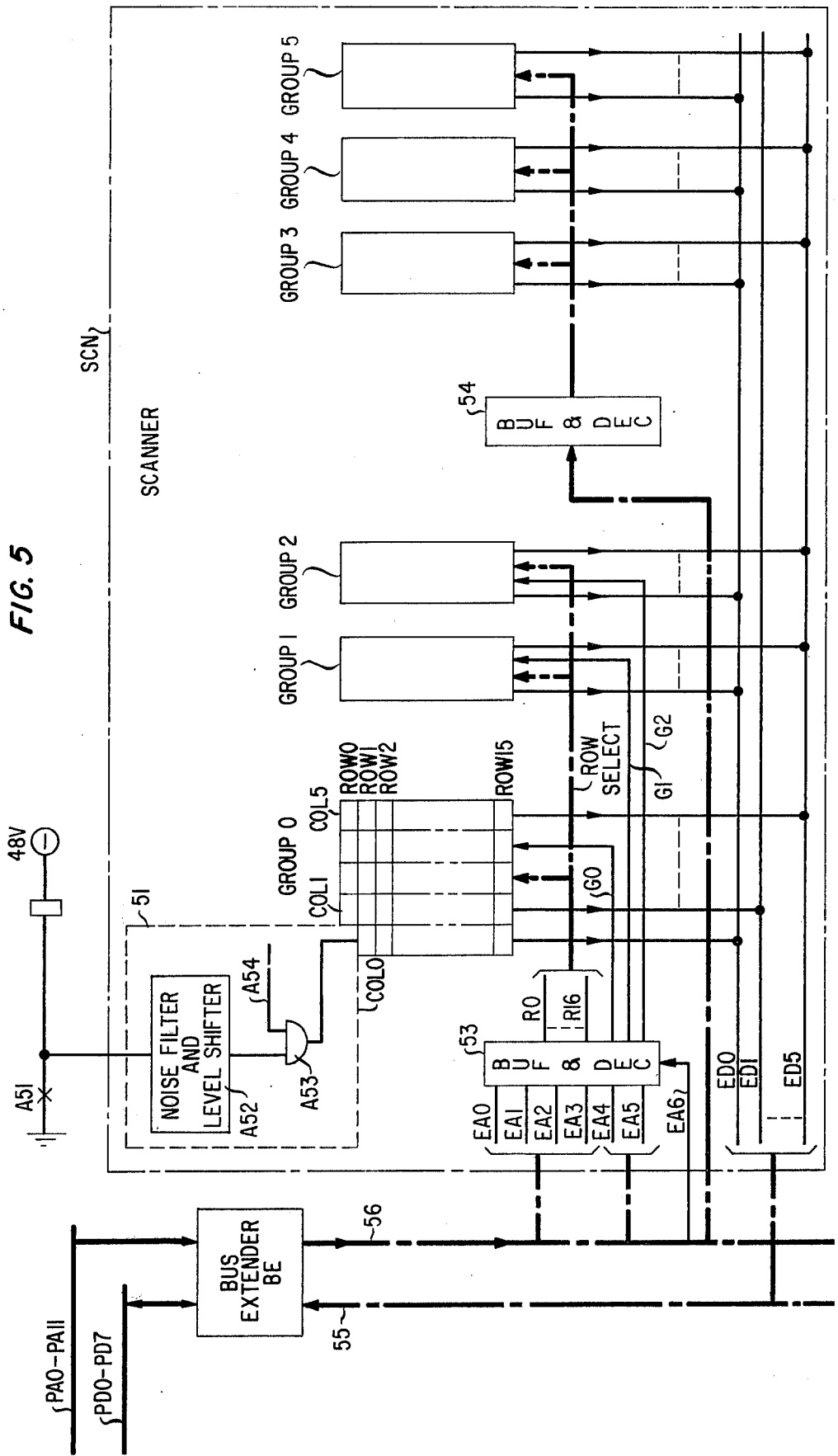

The billing data transmitter also includes scanner SCN in FIG. 5. This scanner is adapted to scan, under program control, 480 electromechanical contacts. These contacts are located in AMA recorders each of which gathers billing information for a plurality of trunk circuits. These recorders and associated circuits which interact with the trunk circuit are generalized in R. B. Curtis application Ser. No. 516,624, filed Oct. 21, 1974. this circuitry is shown in greater detail in H. D. Cahill et al. U.S. Pat. No. 3,599,358, issued June 3, 1952. In prior art arrangements, such as the above-mentioned application and patent, a paper tape perforator was responsive to information in the AMA recorders for indicating the billing information on paper tape. This paper tape was hand-carried to a centralized accounting center and then processed. In contrast, the billing data transmitter is designed to expedite the transmission of billing data directly to a centralized processing unit avoiding the need for an intermediary storage medium such as paper tape or magnetic tape. Thus, scanner SCN gathers raw AMA data for the processing units DMU0 and DMU1 which format the raw data into billing data associated with particular calling telephone stations. This formated billing data is then transmitted directly to the recording center over a data link, as hereinafter explained.

The scanner comprises six groups of matrices (GROUP 0-GROUP 5) each adapted to monitor 80 scan points. For example, with reference to GROUP 0, the matrix is divided into 16 rows designated ROW 0-ROW 15 and six columns designated COL 0-COL 5. A scan point is located at the intersection of each column and each row, and each scan point is uniquely associated with one of the scan points in the electromechanical switching office. For example, scan point 51 (which comprises circuit A52 and gate A53) in GROUP 0 is uniquely associated with contact A51 in FIG. 5. When make contact A51 is open (unoperated) the voltage of −48 (negative battery) is applied to noise filter and level shift circuit A52; and when this contact is closed, ground is applied to circuit A52. This circuit comprises well-known circuitry for filtering out minor perturbations in contact closure and is also adapted to shift an input of negative battery to an output voltage of ground and to shift an input of grond to positive 5 volts. As hereinafter explained, when gate A53 is strobed by the data processing system by enabling lead A54, the output of circuit A52 is essentially applied to scan point 51 via circuit A52 and gate A53, and controls the state of this scan point. Similarly, each of the other scan points in GROUP 0 is uniquely associated with a particular contact (now shown to simplify the drawing) and indicates the state of the associated contact when the scan point is enabled. GROUPS 1 through 5 are structurally identical to previously described GROUP 0 and need not be described further at this time.

Signal distributor SDT in FIG. 6 is provided in the billing data transmitter to control the state of certain relays in the switching office, such as in a recorder interfere circuit. To elaborate, a matrix of 64 flip-flops designated F/F 00 – F/F 77 (where the first digit identifies a row and the second digit identifies a column) is provided with each flip-flop adapted to control a mercury relay. For example, flip-flop FF07 controls relay RO7 in FIG. 6. When this relay is operated, make contact RO7-1 is closed operating illlustrative relay 61 in the switching office. To simplify the drawing only this one relay is shown; however, it should be understood that other relays not shown are also provided and controlled by distributor SDT.

With reference to FIG. 4 data sets DS1 and DS2 are provided to handle the bilateral transmission of information between the billing data transmitter (BDT) and the No. 1 AMARC. Data set DS1 is connected to No. 1 AMARC over a dedicated communication path. If for any reason, communication over this dedicated path is lost or adversely affected, a dial-up link is established to data set DS2 by No. 1 AMARC and communication is continued in the normal manner utilizing data set DS2. An unauthorized entry system is utilized in conjunction with these data sets to prevent unauthorized users from gaining access to data set DS2. To elaborate, the transmission and reception of information is switched from data set DS1 to DS2 only upon the concurrence of two conditions: (1) receipt of a predetermined message by data set DS2 and (2) the failure of data set DS1 to receive predetermined messages polling the BDT within a specified time interval.

One of the primary functions of automatic message accounting equipment is to time the duration of calls. The timing must be as precise as possible with every effort being made never to over time on a call and thereby overcharge the subscriber. To this end, the billing data transmitter operates in accordance with the teachings of the above-specified R. B. Curtis application. Whenever a trunk circuit is required to wait momentarily for the services of a recorder, a time allowance of the maximum time that a trunk could have been required to wait for such service is subtracted from the disconnect time recorded for that call. Clock CLK in FIG. 4 includes a 12.5 MHz crystal oscillator CRY which drives a precision timer called a tick counter that supplies a 0.1 second timing indication for billing information purposes, as hereinafter described more fully.

The following will now describe the operation of the billing data transmitter in greater detail particularly in regard to how parity generation, parity checks and bus matches are performed in accordance with the principles of my invention. The basic cycle time of the microprocesors is 2μs. With reference to FIG. 8, it is seen that each 2μs period is divided into a 1200ns fetch cycle and an 800ns execute cycle. During the fetch portion, a 14 bit address is applied in part (i.e., 6 bits) from displacement register DR (register 25 in Sevcik) in control unit CU8 in FIG. 3 and the remaining part from program address register PAR0 (register 105 in Sevcik) in DMU0 to program storage units PSU1 — PSUN. Only a selected one of the storage units responds to this 14 bit address and outputs the program order word stored at this address. Then during the execute portion of the cycle, the instruction is decoded and the specific functions indicated thereby are performed both in the processing units and in the peripheral circuits (e.g., scanner SCN, distributor SDT). Specific timing considerations in the microprocessing unit are described in the above-mentioned Sevcik application and are mentioned herein only to the extent necessary to fully understand the operation of this one illustrative embodiment of my invention.

Buffer memory is provided to temporarily store AMA information before it is conveyed to the No. 1 AMARC. Two random access memories designatd RAM 1 and RAM 2 are provided as shown in FIG. 4. These memories each store 1024 nine bit words.

Three groups of leads referred to generically a device select leads are provided to control the gating of information to and from the peripheral devices. These leads D0-D3, S0-S2 and N0-N3 are shown in FIG. 3 and extend to all peripheral devices; however to simplify the drawing the connections to all such devices are not illustrated. The first group are called destination leads and are designated D0-D3. These destination leads represent the clocked output of three of the otput leads of Sevcik's decoder 112 in his FIG. 1. The second group are called source leads and are designated S0-S2 and represent the non-clocked outputs from Sevcik's decoder 111. The third group designated N0-N3 are utilized in conjunction with both the source and destination leads and leads N0-N3 respectively correspond to data bits 9-12 output from program storage units PSU1-PSUN (or corresponding bits from Sevcik's memory 24). The destination leads in combination with the N leads operate to identify the destination of data in the periphery or, in other words enable a specified peripheral device to receive data from the peripheral data bus. In contrast, the source leads in combination with the N leads operate to identify the source of data in the periphery (i.e., enable a specified peripheral device to gate data onto the peripheral data bus for receipt by the data processing units).

Assuming billing data is to be written in one of these memories, a "peripheral write" program instruction is executed resulting in an address being applied by each unit DMU1 and DMU0 in FIG. 3 to output buses OB1 and OB0, respectively. During the execute portion of this instruction, the eight bit address on output bus OB1 is gated into peripheral address register 32 in FIG. 3 responsive to HIGH state of lead LOAD PEAR (which logically is D2 LTCH+D3 LTCH). A second peripheral address register 33 is also provided in FIG. 3 to store four additional address bits needed to access the random access memories. These additional bits are generated by performing logical operations on certain of the bits on output bus OB1 in accordance with the control signals on leads N0-N3 and one of the D leads. The contents of registers 32 and 33, in combination, form a 12-bit address utilized to access random access memory.

After the address is loaded into register PEAR (which includes registers 32 and 33 mentioned above), parity subnetwork 34 in FIG. 3 generates a parity bit over the eight low order address bits in register 32, which are the same bits as those on output bus OB1. At the same time, parity subnetwork 35 generates parity over the address on bus OB0. Since both data manipulation unit DMU1 and DMU0 operate in synchronism and execute the same instruction at the same time, an identical address should have been applied to the output buses OB1 and OB0 and therefore the parity bits generated by subnetworks 34 and 35 should match. EXCLUSIVE NOR gate 36 performs a comparison of these parity bits and lead BUS MATCH goes LOW only if these parities mismatch. This LOW signal at the trailing edge of LOAD PEAR sets flip-flop EXTERNAL BUS MISMATCH which in turn sets flip-flop STOP. Flip-flop STOP in turn inhibits clock CLK in FIG. 4 from providing any more clock signals after it reaches a predetermined timing point. This halts the entire data processing system until diagnostics are performed and the system attempts to restart itself.

At the end of the execute portion when the signal designated TCLK in FIG. 8 goes from a HIGH state to a LOW state, internal comparator IC in control unit CU8 in FIG. 3 compares the addresses on the two output buses. If these addresses do not match, comparator IC generates a HIGH signal on lead 37 setting internal mismatch flip-flop 38 at the trailing edge of LTCH which in turn sets flip-flop STOP. The operation of the system is then inhibited as described above. Two separate comparisons (i.e., internal and external) may at first seem to be redundant; however, comparator IC compares the bus information internal to the microprocessing unit whereas the parity subnetworks perform this comparison in the peripheral circuits which are external to the microprocessing units. As mentioned preciously, this external comparison is essential to ensure that information internal to the microprocessing units is actually being received by the peripheral circuits over the connectorized bus leads.

On the next program instruction, the data to be written in random access memory RAM1 or RAM2 is applied by each of the data manipulation units DMU0 and DMU1 to their respective output buses OB0 and OB1. Parity subnetwork 35 now provides a parity indication over the data on bus OB0 while parity network 34 continues to provide the parity indication over the contents of peripheral address register 32. Parity subnetwork 38 also continues to provide a parity indication over the high order address bits (bits 8-11) stored in peripheral address register 33. Gate 36 responsive to the parity outputs of subnetworks 34 and 35 provides a combined parity indication over the data and low order address bits, which indication is combined by EXCLUSIVE NOR gate 39 with the parity over the high order address bits output by subnetwork 38. Thus, gate 39 provides a combined parity indication over the entire 12 bit address and 8 bits of data to be written into random access memory. This combined indication is gated by gate 321 onto the peripheral parity bus designated PO when lead WRITE (i.e., D0 or D1 is HIGH) is high. At the same time, the data itself is gated from bus OB0 through symbolic gate 322 onto the peripheral data bus. Gate 322 is symbolic of 8 gates utilized to gate 8 bits of data onto the peripheral data bus. On the peripheral data bus these 8 bits are designated PD0–PD7. Responsive to the state of destination lead D0 and certain address bits in PEAR, a designated one of the random access memories RAM1 or RAM2 stores the data PD0–PD7 on the peripheral data bus and the parity bit P0 on the peripheral parity bus at the memory location identified by address PA0-PA11 (from registers 32 and 33) on the peripheral address bus.

As mentioned previously, comparator IC in FIG. 3 compares the information on the output buses OB0 and OB1 at the end of each of the execute portions of each of the program instructions. Thus, now comparator IC compares the data on the output buses.

To read information from random access memory, another series of program instruction must be executed. First, an address is loaded in register PEAR in the manner previously described. Then the output from gate 36 is again utilized as an indication whether the information on the output buses matches. Then on the next peripheral read instruction, the random access memories are enabled by the state of the device select leads and retrieve the data and stored parity bit in the memory at the address indicated by address bits PA0—PA11 on the peripheral address bus. The retrieved data now appears as bits PD0-PD7 on the peripheral data bus and is first buffered by buffer 323 an then applied to latch 324. Also the retrieved parity bit stored with the data is applied to the peripheral parity bus PO. Latch 324 comprises well known commercially available circuitry in which the state of the output leads of the latch follow the state of input leads to the latch until the latch is closed. Then the latch continues to output the then existing state of its input leads irrespective of later changes in state of the input leads. Latch 324 is used to ensure that stable input levels are applied to the data manipulating units.

With reference to FIG. 8, the waveform LTCH is shown. This waveform lasts for the first 600ns of the execute portion of each instruction. When LTCH is HIGH, the output leads of latch 324 follow the states of the input leads (PD0–PD7). Then when LTCH goes LOW, latch 324 closes. These output signals are applied onto input bus 0–1 which applies them to each of the data manipulation units DMU0 and DMU1. The retrieved data is gated through the multiplexer MUX in each of the data manipulation units back onto the respective output buses OB0 and OB1. The retrieved data is not gated into registers 32 and 33 (i.e., because lead LOAD PEAR is LOW). Thus, parity subnetworks 34 and 38 continue to provide a parity indication over both portions of the instant address. However, now the retrieved data appears on bus OB0 and, accordingly, parity subnetwork 35 generates a parity indication over the retrieved data. This indication is first combined by gate 36 with the parity indication over the low order address bits output from network 34. Then gate 39 responsive to the outputs of gate 36 and network 38 provides a combined parity indication over the retrieved data and address utilized to retrieve this data. Gate 326 then compares the generated combined parity indication with retrieved parity indication PO now found on the peripheral parity bus (as output from memory RAM1 or RAM2). These parity indications should match indicating that the retrieved data appears to have the correct parity; however, if a mismatch is detected, gate 326 generates a LOW output signal to set PARITY CHECK FAILURE flip-flop 44 at trailing edge of a READ MEMORY indication (i.e., so TCLK) on its clock input. The output of this flip-flop then sets flip-flop STOP and the operation of the system is inhibited in the manner previously described.

Thus, in accordance with several features of my invention, the parity generation, parity check and bus mismatch circuit 327 in FIG. 3 beneficially performs three functions: (1) compares parity generated over the addresses on OUTPUT buses OB0 and OB1; (2) generates a combined parity indication over the address and data to be written in memory; and (3) computes parity over an address and retrieved data and then compares this computed parity with the parity indication retrieved from memory. This third feature is beneficially realized by gating the retrieved data from the input bus through the data manipulation units and back onto the output buses. Thus using this looparound technique, a single parity subnetwork can be beneficially utilized for computing parity over both data to be read into memory and data to be written in memory.

As previously described, clock signals TCLK and LTCH illustrated in FIG. 8 are generated by clock CLK in FIG. 4. This clock comprises a crystal controlled oscillator which generates a 12.5 MHz square wave which in turn drives two serially arranged decade counters 45 and 46. These counters are cascaded so that the overflow signal from counter 45 serves as the input to counter 46. Signals TCLK and LTCH are generated directly from counter 45 and serve as the basic timing vehicles for the entire data processing system. Clock CLK in FIG. 4 performs the functions of clock 26 in the above-mentioned Sevcik application and moreover, clock CLK also provides 0.1 second timing indications for "tick" timing.

To elaborate, every 0.1 second, counter 46 generates a HIGH output on lead 47 and sets flip-flop TICK, The program in the microprocessing system is designed to interrogate the state of the TICK flip-flop every 9 ms in order to up-date a software clock which is utilized for billing purposes. To interrogate the TICK flip-flop, the data manipulation units DMU1 and DMU0 institute a program instruction which causes certain indicated ones of the device select leads to assume predetermined states which are recognized by decoder 48 in FIG. 4. Thus, during the execute cyle of this instruction, decoder 48 generates a HIGH output or lead 491, which output enables gate 49 to gate the present state of the TICK flip-flop onto data lead PD0. The state of this lead is extended over the peripheral data bus through latch 324 in FIG. 3 and over the input buses to the data manipulation units in the normal manner. The present state of lead PD0 controls whether or not the software clock is updated to reflect a change in time. The HIGH output from decoder 48 is also inverted by gate 451 and serves to clear the TICK flip-flop on the HIGH to LOW transition of decoder 48's output so that it will be receptive to the next TICK signal from counter 46.

Since timing is an essential part of gathering AMA information, several diagnostic checks are made to verify the integrity of the timing operation. Every 20 ms, counter 46 generates a HIGH pulse on lead 452. If a TICK counter is still set such that the Q output is HIGH, then gate 453 generates a HIGH output which sets flip-flop STOP and inhibits the clock in the previously described manner. This check ensures that the program has updated its internal clock within 20 ms after the TICK flip-flop was first set. If the software clock is not being updated correctly, then the continued billing operation is senseless and the entire system is therefore placed in a diagnostic mode. Of course, even though the billing data transmitter is in a failure mode, this does not affect the initiation and continuation of telephone calls, except adjustments will be made to subscriber billing.

Since the above diagnostic test will not detect a situation in which the TICK flip-flop was not being set, analog timer WD in FIG. 4 is provided to monitor the output of the TICK flip-flop to ensure that it is being set properly. After 150 ms this timer provides a HIGH signal on lead TIMEOUT if it had not been previously reset over lead 454 by the setting of the TICK flip-flop. Thus, each time lead 454 (Q output) goes HIGH, timer WO is reset and begins timing anew. The failure to set the TICK flip-flop should be detected within 150 ms, and results in the setting of flip-flop STOP. Communication between the billing data transmitter and No. 1 AMARC as mentioned previously is carried out utilizing data sets DS1 and DS2. Circuit PIOC is associated with data set DS1 for supplying the data set with information to transmit and for receiving the information transmitted from No. 1 AMARC. Circuit PIOC comprises well known decoding and buffering apparatus responsive to the states of the device select leads for receiving data from the peripheral data bus or supplying to this bus, data previously received by data set DS1 over the dedicated data link. Circuit SIOC is associated with data set DS2 and performs a similar function in regard to this secondary "back-up" data channel.

Because scanner SCN in FIG. 5 and signal distributor SDT in FIG. 6 cooperate with electromechanical devices such as relays, their speed of operation must necessarily be slower than that of the data processing system itself. Accordingly, bus extender circuit BE in FIG. 5 is provided for buffering data and address information received over the peripheral data and address buses. This circuit also includes the normal deoding apparatus responsive to the states of the device select leads for receiving data or address information from the buses or applying data to the peripheral data bus. For example, when the microprocessors want to obtain present state information for a group of scan points, an address identifying a particular row of flip-flops in one of the groups (GROUP 0-GROUP 5) is loaded into register PEAR in FIG. 3 in the normal manner. During the execute portion of the cycle, extender circuit BE buffers this address from the peripheral address bus under the control of the device select leads and applies the address to decoder-buffers 53 and 54 in FIG. 5. Buffers 53 and 54 are identical except that buffer 53 controls access to GROUPS 0-2 and buffer 54 controls access to GROUPS 3-5. Responsive to extended address bits EA0-EA3 (which are the buffered version of peripheral address bits PA0-PA3, respectively), buffer 53 generates a signal on one of its output leads ROR-16 in cable ROW SELECT to enable all the scan points in the designated row. Leads R0-R16 respectively correspond to rows ROW0-ROW15. The state of leads EA4 and EA5 (buffered leads PA4 and PA5) is also decoded to select one of the three GROUPS 0-2 associated with buffer 53. Finally, lead EA6 (buffered lead PA6) selects either buffer 53 or buffer 54. Thus, bits EA0-EA6 in combination identify one row in one group of scanpoints. The states of each of the scan points in the selected row in the selected group are applied to leads ED0-ED5 respectively associated with each of the 6 columns COL1-COL5 in each group. Thus, for example, when row 0 of GROUP 0 is scanned, the enable leads such as A54, go HIGH. Then, leads ED0-ED5 reflex the states of the scanned row. For example, the ouput of gate A53 is applied to lead ED0. Thus, the outputs of scan points in each column are multiplied together. The present state scan point information for each of the scan points in the selected row is then conveyed over cable 55 to bus extender circuit BE. This information (ED0-ED5) is gated onto the peripheral data bus as bits PD0-PD5 and finally into the data manipulation units DMU0-DMU1 over their input buses in the normal fashion.

Scanner SCN is not autonomously controlled, but rather only obtains information for selected scan points responsive to commands and address information from the data manipulation units, as described above.

As mentioned previously signal distributor SDT in FIG. 6 also interfaces with the data manipulation units through the bus extender in FIG. 5 Address information is received over the pripheral address bus by the bus extender BE and applied to cable 56. Responsive to this address information, and the state of the device select leads, decoder 62 generates a signal on one of its 8 output leads designated CLKCOL0-CLKCOL7. At the same time that address information is applied to decoder 62, data concerning an entire column of signal distributor flip-flops is received over cable 55, which data was previously received from the peripheral data bus. When one of the CLKCOLleads goes HIGH, the information on leads ED0-ED7 is gated into the enabled column of flip-flops and controls the states of these flip-flops. As mentioned previously, each of these flip-flops is uniquely associated with a relay (such as RO7) which operates a single make contact (such as RO7-1) to control the state of other equipment in the switching office.

Although this one illustrative embodiment of my invention is implemented in an AMA telephone billing arrangement, it should be apparent that the principles of my invention are not so limited, but rather may be implemented in any duplicated processor system to beneficially perform the diagnostic functions described above.

What is claimed is:

1. A diagnostic arrangement for use with a pair of duplicated processing units operating in synchronism, each of said units including an output bus connected to a memory, one of said output buses connectd to said memory via an address register, said arrangement comprising a first parity network providing a first parity indication over the contents of said address register, a second parity network providing a second parity indication over information on the other of said output buses, means for combining said first and second parity indications to generate a combined parity indication, means responsive to said combining means and to the loading by one of said processing units via said one output bus of said address register with an address identifying a storage location in said memory for providing a bus mismatch signal if said first and second parity indications do not match, and means responsive to the loading by said processing units of said output buses with data to be written in said memory and to said combining means for storing in said memory both said combined parity indication and said data, whereby said combined parity indication now indicates parity over said data and over the address in said address register.

2. The arrangement of claim 1 wherein said processing units also include an input bus for receiving data retrieved from said memory and wherein a parity lead is provided to indicate a parity indication retrieved from said memory along with said data, said retrieved parity indication indicating parity over said retrieved data and address at which said retrieved data was stored, said arrangement further comprising means for applying said read data to said units via said input bus, means in each of said units for gating said read data from said input bus onto its respective output bus, and means for comparing said retrieved parity indication on said parity lead with said combined indication and for generating an error signal if a parity mismatch is detected.

3. In a data processing system comprising a pair of duplicated processing units operating synchronously but independently and each connected to a respective output bus over which data and address information is communicated to peripheral circuits including a memory, and a peripheral address register connected to one of said units via one of said output buses; a diagnostic and parity generation arrangement comprising a first parity generator providing a first parity indication over the contents of said peripheral address register.

a seond parity generator providing a second parity indication over the information on the other one of said output buses, means for combining said first and second parity indications to generate a combined parity indication, means responsive to said combined parity indication and to the loading of said peripheral address register with said address via said one output bus for generating a bus mismatch signal if said first and second parity indications do not match, and means responsive to the application to said output buses by said processing untis of data destined for said memory for storing in said memory both said combined parity indication and said data whereby said stored parity indication indicates parity over said address and over said data.

4. In the data processing system of claim 3 wherein parity indicia and data retrieved from said memory are respectively applied to a parity lead and to an input bus connected to each of said units, said diagnostic and parity generation arrangement further comprising means in each of said units operable to gate said retrieved data from said input bus onto the output bus connected to said each unit, and means for comparing said retrieved parity indicia with said combined parity indication and for generating an error signal if a mismatch is detected.

5. For use in a duplicated microprocessing system comprising a first data manipulation unit comprising a plurality of registers and logic circuits, and connected to a first output bus to convey information via a peripheral address register to a first memory and also connected to an input bus to receive information from said first memory, a second data manipulation unit comprising a plurality of registers and logic circuits, and connected to a second output bus to convey information to said first memory and also connected to an input bus to receive information from said first memory, a second memory storing a plurality of program instructions, and each of said units responsive to program instructions retrieved from said second memory and each executing said retrieved program instructions to control the flow of information between said registers and logic circuits therein, and a selected one of said units also controlling the flow of information between said units and said first memory and said units operating in synchronism and each applying an address and then data to its respective output bus; a diagnostic and parity generation arrangement comprising a first parity generator providing a first parity indication over the contents of said peripheral address register, a second parity generator providing a second parity indication over the instant information on said second output bus, means for combining said first and second parity indicaions to generate a combined parity indication, means responsive to the loading of said address from said first output bus into said peripheral address register and to said combined parity indication for generating a bus mismatch signal if said first and second parity indications do not match, and means for applying said combined parity indication to said first memory for storage therein with said data, wherein when said data is applied to said buses said combined parity indication indicates parity over said data and said address.

6. For use with a pair of processing units, one of said units connected to an address register via a first output bus, and the other of said units receiving data retrieved from a memory via an input bus and applying data to be stored in said memory via a second output bus, said memory having a plurality of discrete addressable locations each adapted to store a data word and a parity bit over said data word and over the address identifying the location at which said data word is stored, said memory responsive to address information in said address register for retrieving both the data word and the parity bit stored at the memory location identified by said address information and for applying said retrieved data to said input bus; a diagnostic arrangement comprising first parity generator means connected to said address register for generating a first parity indication over said address information therein, control means including said other unit for gating said retrieved data word from said input bus onto said second output bus, second parity generator means connected to said second output bus for generating a second parity indication over said retrieved data word thereon, logic means for combining said first and second parity indications and for generating a combined parity indication, and means for comparing said combined parity indication with said retrieved parity bit and for generating an error signal if a mismatch is detected.

7. In a data processing system comprising
- a pair of processing units operating independently but synchronously to apply an address to first and second output buses respectively and then to apply data to said first and second buses respectively;
- a register for storing an address applied to said first bus;
- a memory for storing, at the address in said register, the data on said second bus and a parity bit over said data and said address; a diagnostic and parity generation arrangement comprising
- a first parity generator providing a first parity indication over said address in said register;
- a second parity generator proiding a second parity indication over the instant information on said second bus;
- combining means for combining said first and second parity indications to generate a combined parity indication;
- means responsive to said combining means and to the loading of said address in said register by one of said processing units for generating an error signal if said parity indications do not match; and
- means for applying said combined parity indication to said memory, wherein when said data is applied to said buses said combined parity indication represents the parity bit over said data and said address.

* * * * *